June 5, 1962 V. A. ROSS ET AL 3,037,311
ADVERTISING DISPLAY ASSEMBLY
Filed Nov. 2, 1959 2 Sheets-Sheet 1
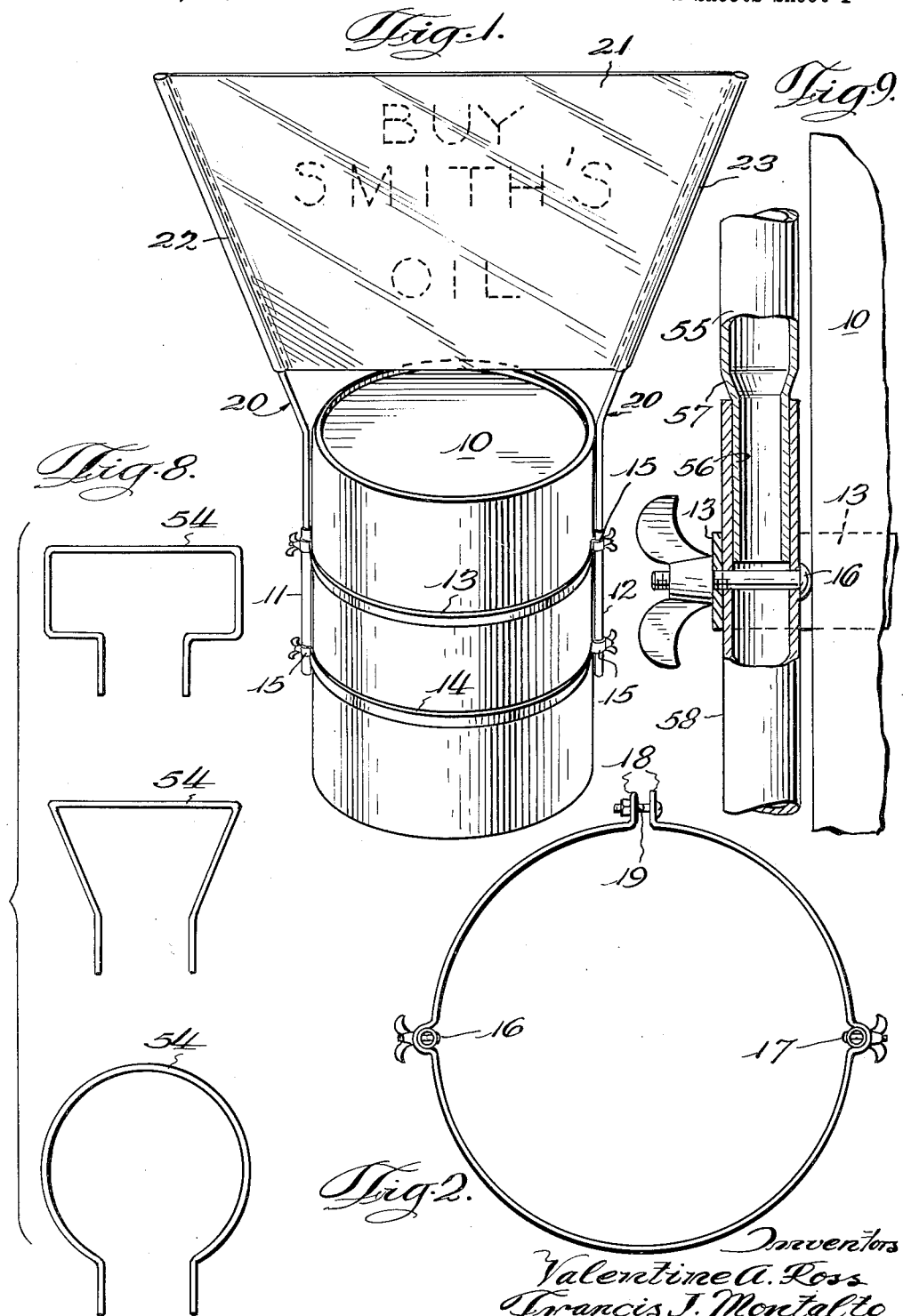

June 5, 1962 V. A. ROSS ET AL 3,037,311
ADVERTISING DISPLAY ASSEMBLY
Filed Nov. 2, 1959 2 Sheets-Sheet 2
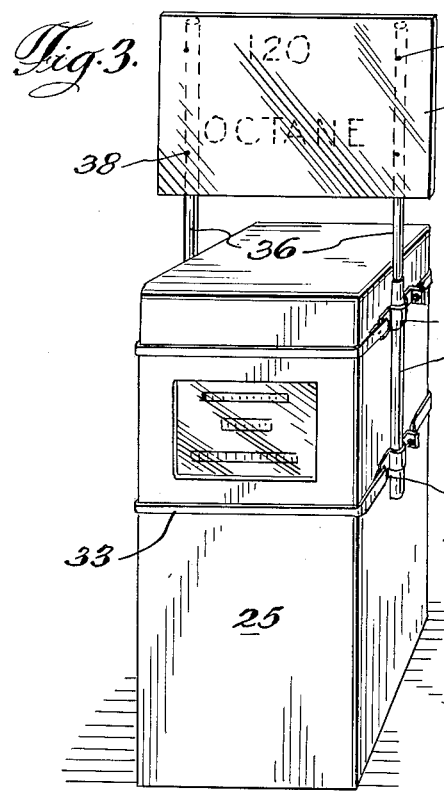
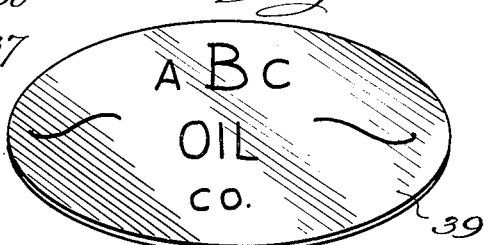
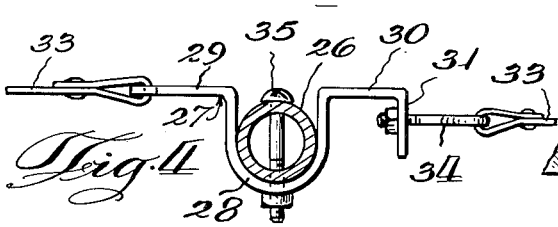
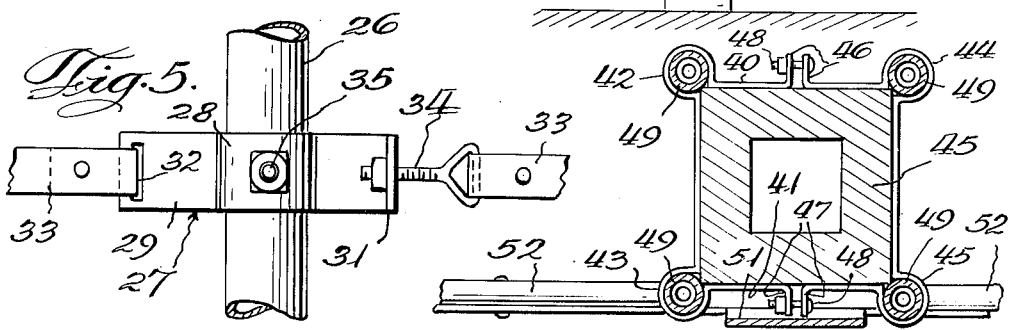

United States Patent Office 3,037,311
Patented June 5, 1962

3,037,311
ADVERTISING DISPLAY ASSEMBLY
Valentine A. Ross, Riverside, and Francis J. Montalto, Chicago, Ill., assignors to MCR Enterprises, Inc., Chicago, Ill., a corporation of Delaware
Filed Nov. 2, 1959, Ser. No. 850,327
6 Claims. (Cl. 40—125)

This invention relates to advertising display devices. It more specifically relates to display assemblies specially adapted for the display of point-of-sale advertising.

In order to stimulate consumer purchases by advising or reminding the purchaser of the availability of services or products which they did not include in their preconceived purchase plan, various techniques are used. This merchandising problem is somewhat simplified in supermarket operations where the purchaser is personally exposed to the array of available products. The problem, however, is more complicated in the case of gasoline station sales promotion where the customer in placing his order for gasoline generally does not leave the automobile during the fueling operation. Accordingly, to stimulate the purchases of fuel lubricants and promote the sale of TBA (tires, batteries, and accessories) and lubrication services, point of sale advertising is displayed in prominent places in the station area advising of the availability of such merchandise or extolling the advantages and quality of the products and services.

In a gas station there are a number of items which can be used as a base for the display of advertising banners, cards, or attraction devices. Code sign pole, gasoline pump housing, island light poles, containers such as drums, stacks of merchandise such as tires, battery boxes, and others are available for the attachment of suitable brackets for holding the display advertising material. It has been the practice, heretofore, that after a display advertising layout has been prepared, a specific bracket would be designed for holding the display in the selected location. After the display had outlived its useful life both the display panel and supporting bracket would be removed and a new display and its mounting bracket substituted or installed in a new location. This is not only inconvenient for the display designer but also for the installer or service station attendant who is charged with the installation of the sales promotion because of the spate of installations which are made for the various advertising and sales promotion programs.

According to this invention there is provided an advertising display system which utilizes a mounting arrangement for use with a variety of display panels. The mounting bracket is semi-permanently installed on a suitable base member such as a code sign post, gasoline pump housing, product drum, and so forth and flexibility is provided by utilizing a number of different upright standards adapted to be held in the mounting bracket and across which is spanned the selected advertising display panel.

Referring to the drawings:

FIGURE 1 is an embodiment of this invention illustrating its installation on a product drum containing lube oil, grease, etc.

FIGURE 2 is a cross section view through line 2—2 of FIGURE 1 showing a typical strap arrangement for securing the socket element of the bracket in position.

FIGURE 3 illustrates a bracket assembly employed for mounting on a gasoline pump housing.

FIGURE 4 is an enlarged plan view of the socket element connection with the mounting strap used in the bracket assembly shown in FIGURE 3.

FIGURE 5 is an enlarged elevation view of the assembly shown in FIGURE 4.

FIGURE 6 shows the use of the bracket assembly of the instant invention mounted on a code sign pole.

FIGURE 7 is an enlarged cross-sectional view along line 7—7 of FIGURE 6 of an illustrative bracket assembly.

FIGURE 8 presents schematically a plurality of combinations of upright standards which can be mounted in the bracket assembly of this assembly.

FIGURE 9 is a cross-sectional view showing a preferred telescoping mounting for installing the upright standards within the tubular socket.

One of the important features of the instant invention is the flexibility of bracket assembly to adapt to a number of different display panel configurations and to be mounted on a variety of bases. In FIGURE 1 a product drum 10; for example, a 42 gallon lube oil drum or a 100 pound lubricating grease drum, is employed as the base. A pair of diametrically opposed tubular sockets 11 and 12 are held in place by a pair of spaced metal bands or straps 13 and 14 engirding drum 10. The socket elements 11 and 12 are held within the U-shaped clamp portions 15 of straps 13 and 14 and preferably secured in position by threaded fasteners 16 and 17 passing through the wall of the socket element 11 and the web of strap clamp 15. A continuous metal strap can be used as shown in which the flanged terminal ends 13 are coupled by means of a suitable threaded fastener 19 or a pair of mating straps, suitably coupled, each member of the pair encompassing less than about 180° of the drum periphery and being provided with a clamp portion 15, can be employed. One end of an upright standard 20 is telescoped within the socket element 11. The oblique upper portions of the standards 20 diverge outwardly to provide a mounting area for display panel 21 which is prepared from a flexible sheeting such as canvas or the like. The marginal edges are hemmed to form pockets 22 and 23 through which the oblique portions of standards 20 are reeved. Suitable indicia is imprinted upon one or both sides of panel 21.

In another embodiment of this invention presented in FIGURE 3, a mounting bracket suitable for use in fastening the bracket assembly to surfaces which may be marred by metal straps is shown. The base member employed to illustrate this variation is a gasoline pump housing 25 having an enameled surface. The tubular socket elements 26 are held in socket clamps 27, shown in more detail in FIGURES 4 and 5, which consist of a U-shaped clamp portion 28 having a first lateral leg 29 on one side thereof and a second lateral leg 30 on the other side thereof. The second lateral leg 30 terminates in an upstanding flange 31. The first leg is provided with a slot 32 through which is looped one end of flexible fabric strap 33 to secure bracket 27 in the bight thereof. An eyebolt 34 is attached to the other end of strap 33. A pair of such bracket assemblies is coupled each to the other to encompass the housing and secure one end of each of the socket elements 26 in place. Each of the other ends of the socket elements 26 are secured in position by like pairs of bracket assemblies. Threaded fasteners 35 are used to hold the socket elements in place within the clamp portion of the brackets 27. Vertical standards 36 are fitted within the socket elements 26 to provide spaced supports across which are mounted a rigid display panel 37 upon which is imprinted suitable advertising copy. Panel 37 is secured to the vertical standards by suitable fasteners 38.

Still another embodiment is illustrated in FIGURE 6 wherein a bracket assembly for use on a code sign pole is presented. Code signs are large elevated signs, generally located at the street intersection corner of the station plot, upon which are emblazoned the company's identification mark 39. For these installations a pair of opposed brackets 40 and 41, each of which is provided with spaced, cooperating, U-shaped clamp portions 42, 43, 44, and 45, encompasses pole 45 and is held in place by a suitable clamping means which can consist of cooperating terminal flanges 46 and 47 coupled together by a suitable fastener 48 as shown. Tubular socket elements 49 are held in place as in the above described installations by securing a pair of brackets 40 and 41 adjacent each end of the socket element. In order to present a finished display on either side of the code sign pole 45 each member of the bracket pair 40 and 41 is provided with two clamp portions 42 and 43; and 44 and 45, for holding a pair of upright standards 50 on opposed sides of the code sign pole 45 to support the opposing display panels 51 which as shown are I-shaped. For this type of panel configuration, the lower portion of the display panel is supported by a second pair of standards 52 depending downwardly from the socket elements. To prevent the standards from being displaced from the socket elements suitable fasteners such as removable pins (not shown) extending transversely through the socket and standard mounted therein are used.

One of the principal advantages of this invention is the variation in display panel designs which can be mounted with the subject bracket. The socket elements secured in place on the selected bases by the brackets can be left in place as a semi-permanent installation and a variety of upright standards used to provide a suitable framework for holding the display panel selected for use for a given sales promotion program. As schematically shown in FIGURE 8 the upright standards 54 can be of any desired configuration. Because the terminal ends thereof telescope within the socket elements for mounting, they can be installed or removed with facility. To facilitate the purchase of material for the assembly, the tubular sockets and standards should have the same diameter. Where this expedient is used a preferred mounting arrangement for the standard is shown in FIGURE 9. The terminal end of standard 55 is swaged to provide a mounting stub 56 and a shoulder 57 which rests upon the end of socket element 58. To improve the adaptability of the mounting of this invention the various standards used preferably should be provided with mounting holes for use in the attachment of rigid or semi-rigid display cards such as shown in FIGURE 3.

Conventional materials of construction can be used in fabricating the elements of the bracket assembly of this invention. The tubular sockets can be made from standard tubing, for example, for one installation ¾" thin-walled tubing was used. The brackets including the clamp portions can be made from ⅛" thick metal strap which can also be used to fabricate the remainder of the strap encompassing the base. Where a separate flexible strap such as shown in FIGURE 3 is used, plastic or cloth strips can be used. It is also possible to employ metal strapping conventionally used in packaging systems for mounting the brackets upon the selected bases. To minimize corrosion, the metal parts used should be provided with a protective coating.

Although the instant invention has been described with reference to the foregoing complete specific embodiments, it is evident that variations and modifications thereof can be made which come within the scope of the invention, for example, bracket arrangements can be employed which impart a three dimensional configuration to the advertising display by an appropriate display sign design which can be then assembled on a suitable framework.

What is claimed is:

1. An advertising display assembly constructed to be removably attached to a vertically extending base, comprising a pair of opposed, vertically extending socket elements, a pair of vertically spaced strap members constructed to encompass the base and said socket elements, means for securing said strap members in frictional engagement with the base, and opposed, vertically extending standards having terminal ends telescopically received by said socket elements, said standards adapted to span a display panel therebetween.

2. The invention defined in claim 1 including a display panel spanning said standards.

3. An advertising display assembly constructed to be removably attached to a vertically extending base, comprising a pair of opposed, vertically extending socket elements, a pair of vertically spaced strap members constructed to encompass the base and said socket elements, means for securing said socket elements to said strap members, means for securing said strap members to the base, and opposed, vertically extending standards having terminal ends telescopically received by said socket elements, said standards adapted to span a display panel therebetween.

4. The invention defined in claim 3 including a display panel spanning said standards.

5. An advertising display assembly constructed to be removably attached to a vertically extending base, comprising a pair of opposed, vertically extending socket elements, a strap member constructed to encompass the base and said socket elements, brackets connected to said strap member, means for securing said strap member to the base, each of said brackets having a U-shaped clamp portion within which one of said socket elements is secured, and opposed standards having terminal ends telescopically received by said socket elements, said standards adapted to span a display panel therebetween.

6. The invention defined in claim 5 including a display panel spanning said standards.

References Cited in the file of this patent

UNITED STATES PATENTS

| | | |
|---|---|---|
| 1,018,037 | Dunham | Feb. 20, 1912 |
| 1,373,963 | Hartzell | Apr. 5, 1921 |
| 1,473,040 | Harris | Nov. 6, 1923 |
| 1,748,228 | Jacobs | Feb. 25, 1930 |
| 2,127,930 | Osborn | Aug. 23, 1938 |
| 2,882,630 | Frey | Apr. 21, 1959 |